W. BEILSTEIN.
SLEIGH ATTACHMENT.
APPLICATION FILED FEB. 27, 1911.
1,038,716.
Patented Sept. 17, 1912.
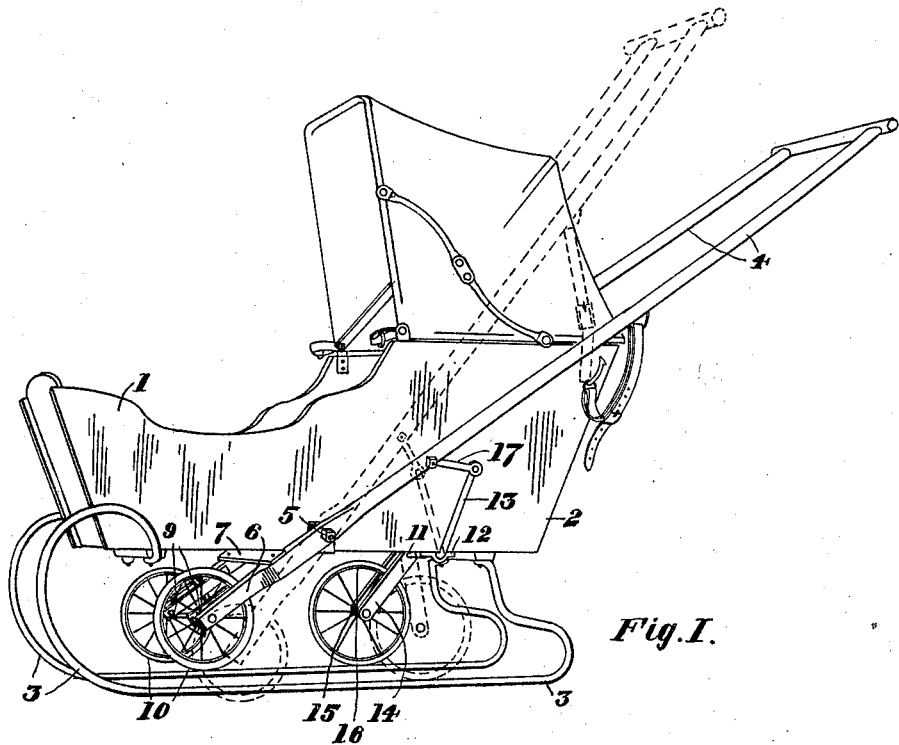
Fig. I.
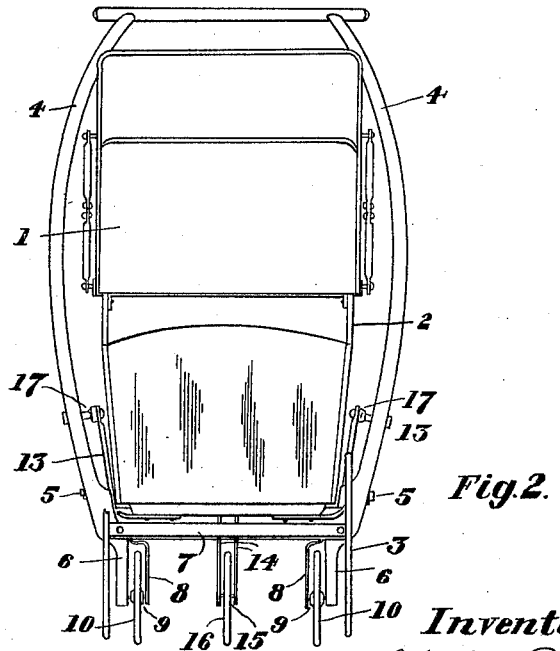
Fig. 2.
Witnesses
Inventor
William Beilstein
COLUMBIA PLANOGRAPH CO., WASHINGTON, D. C.

UNITED STATES PATENT OFFICE.

WILLIAM BEILSTEIN, OF BERLIN, ONTARIO, CANADA, ASSIGNOR OF ONE-HALF TO CARL KRANZ, OF BERLIN, CANADA.

SLEIGH ATTACHMENT.

1,038,716.     Specification of Letters Patent.     Patented Sept. 17, 1912.

Application filed February 27, 1911. Serial No. 611,040.

*To all whom it may concern:*

Be it known that I, WILLIAM BEILSTEIN, a subject of the King of Great Britain, and resident of Berlin, in the county of Waterloo, in the Province of Ontario, in the Dominion of Canada, have invented certain new and useful Improvements in Sleigh Attachments, of which the following is a specification.

The invention relates to improvements in sleigh attachments, as described in the following specification and illustrated in the accompanying drawings that form part of the same.

The invention consists essentially in the novel construction and arrangement of parts, whereby the sleigh runners are raised from the ground by rotatable members adjustably supported from the sleigh.

The object of the invention is to overcome the difficulties incident to the sticking of the sleigh runners upon dry ground.

In the drawings Figure 1 is a perspective view of a hand sleigh equipped with my invention and showing the wheels in the lowered position in dotted lines. Fig. 2 is a front elevational view of the sleigh, showing the wheels in their lowered position, one of the sleigh runners being partly broken away.

Like numerals of reference indicate corresponding parts in each figure.

Referring to the drawings, 1 is a hand sleigh having the body 2 and runners 3.

4 are a pair of handles pivotally secured adjacent to the lower ends by the bolts 5 secured in the body. The lower ends 6 of the handles 4 are offset inwardly and are braced by the cross bar 7 rigidly secured below the pivots and extending under the body 2, said cross bar 7 forming a stop to limit the downward movement of the upper ends of the handles.

8 are offset metal brackets rigidly secured at their upper ends to the inner sides of the offset ends 6 of the handles 4 and forming the jaws 9.

10 are wheels journaled in the jaws 9, said wheels being of a suitable diameter so that when the cross bar 7 engages the under side of the body, the lower portions will be above the bottom of the runners 3.

11 is a rod extending under the body 2 adjacent to the rear end and journaled in the brackets 12 and having the upturned crank ends 13.

14 are a pair of bars rigidly secured to the rod 11 and forming a jaw 15.

16 is a wheel journaled in the jaw 15.

17 are links pivotally secured in the handles 4 above their pivots and pivotally connected at their other ends to the upper ends of the upturned ends 13 of the rod 11.

In the use of this device, the sleigh is pushed along over snow or ice by means of the handles 4, the cross bar 7 bearing against the body and allowing the front end to be tilted up by a downward pressure on the handles. In the event of the sleigh striking dry pavements, the person pushing it merely lifts upwardly upon the handles, thereby swinging them on their pivots. As the lower ends of the handles swing downwardly, the wheels 10 are brought into contact with the ground and the sleigh runners raised.

The upward movement of the handles pulls on the links 17 and through the crank ends 13 turns the rod 11 in its bearings thereby swinging the jaw 15 downwardly and bringing the wheel 16 into contact with the ground simultaneously with the front wheels and raising the rear ends of the runners clear of the ground.

It will thus be seen that a rolling contact with the ground is provided and the sleigh may be easily pushed over the dry spot.

The jaw member 15 is so arranged that when the handles are raised it will incline slightly rearwardly. The weight and forward movement of the sleigh thus holds the handles in the raised position without further effort on the part of the person pushing the sleigh, the crank members 13 and links forming struts.

The members 13 and links do not move into a straight line so that when it is desired to drop the runners, a sharp downward movement of the handle will throw the jaw member forward of the perpendicular and the wheels will then rise clear of the ground.

The preferable means for connecting the rear wheel to the handles is herein shown and described but other means may be adopted or the rear wheel may be dispensed with without departing from the spirit of the invention.

The invention has been shown and described as applied to a hand sleigh but it may be readily applied to other forms of sleighs so long as the essential feature of adjustably supporting rotatable members from the sleigh so that the runners may be raised by the lowering of same is adhered to.

What I claim as my invention is:—

1. In a sleigh attachment, the combination with the sleigh body supported on fixed runners, of a pair of rigidly coupled levers pivoted one to each side of the sleigh body and extending therebelow, wheels carried at the lower ends of said levers normally out of contact with the ground, an arm pivotedly supported beneath the sleigh body and carrying a wheel at its lower end normally out of contact with the ground, and locking means coupling said levers and said arm, whereby all of said wheels are moved into contact with the ground on the swinging of said levers, said levers also forming the propelling handle.

2. In a sleigh attachment, the combination with the sleigh body supported on fixed runners, of a pair of lever members pivotally connected to said sleigh intermediate of their length, wheels journaled on the lower ends of said levers and normally held thereby out of contact with the ground, a rod rotatably supported from the sleigh adjacent to said levers and having a cranked end an arm rigidly connected to said rod and extending downwardly therefrom, a wheel journaled on the end of said arm and a link pivotally secured at one end to the end of said cranked member and at the other end to said lever members, said link member being adapted to swing the arm past the perpendicular.

3. In a sleigh attachment, the combination with the sleigh body supported on fixed runners, of a pair of lever members pivotally connected to said sleigh, intermediate of their length, rotatable members secured to the lower ends of said levers and normally held thereby out of contact with the ground, a rod journaled in suitable bearings on said sleigh and having upwardly bent ends, a jaw member rigidly connected to said rod, a wheel journaled in said jaw, and link members pivotally connected at one end to the ends of said rod and at the other end to said lever members above their pivots.

Signed at Berlin, Ontario, Canada, this tenth day of February 1911.

WILLIAM BEILSTEIN.

Witnesses:
J. A. SCELLEN,
CARL KRANZ.

Copies of this patent may be obtained for five cents each, by addressing the "Commissioner of Patents, Washington, D. C."